(12) United States Patent
Seto

(10) Patent No.: US 11,506,554 B2
(45) Date of Patent: Nov. 22, 2022

(54) PRESSURE SENSOR ELEMENT FOR A PRESSURE SENSOR HAVING A STRAIN RESISTANCE GAUGE ON A FIRST SURFACE OF THE DIAPHRAGM

(71) Applicant: Azbil Corporation, Tokyo (JP)

(72) Inventor: Yuki Seto, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 64 days.

(21) Appl. No.: 17/327,974

(22) Filed: May 24, 2021

(65) Prior Publication Data

US 2021/0372875 A1 Dec. 2, 2021

(30) Foreign Application Priority Data

May 28, 2020 (JP) .............................. JP2020-093061

(51) Int. Cl.
*G01L 9/00* (2006.01)
*G01L 13/02* (2006.01)

(52) U.S. Cl.
CPC .......... *G01L 9/0054* (2013.01); *G01L 9/0042* (2013.01); *G01L 13/025* (2013.01)

(58) Field of Classification Search
None
See application file for complete search history.

(56) References Cited

U.S. PATENT DOCUMENTS

| 9,459,172 | B2 * | 10/2016 | Chen ..................... G01L 9/0055 |
| 2006/0272422 | A1 | 12/2006 | Yoneda et al. |
| 2014/0137652 | A1 * | 5/2014 | Tokuda ................. G01L 13/026 |
| | | | 73/715 |

FOREIGN PATENT DOCUMENTS

| JP | 2005-069736 A | 3/2005 |
| JP | 2020-016559 A | 1/2020 |

* cited by examiner

*Primary Examiner* — Peter J Macchiarolo
*Assistant Examiner* — Jermaine L Jenkins

(57) ABSTRACT

To provide a pressure sensor element and a pressure sensor that have stable pressure sensitivity without the need for improving the accuracy of alignment between a diaphragm and a holding member, a pressure sensor element includes a thin plate diaphragm, a holding member that holds the diaphragm, and one or more strain resistance gauges that are provided on a first surface of the diaphragm and which change in resistance values according to deformation of the diaphragm, in which the holding member has recesses that, formed on an annular first end surface facing the first surface of the diaphragm, cut out parts of an inner circumference of the first end surface, and the strain resistance gauges are disposed near the regions corresponding to the recesses on the first surface of the diaphragm.

20 Claims, 5 Drawing Sheets

PRESSURE SENSOR ELEMENT FOR A PRESSURE SENSOR HAVING A STRAIN RESISTANCE GAUGE ON A FIRST SURFACE OF THE DIAPHRAGM

CROSS REFERENCE TO RELATED APPLICATIONS

This patent application claims the benefit of foreign priority to Japanese Patent Application No. JP 2020-093061 filed on May 28, 2020, the disclosure of which is hereby incorporated by reference in its entirety.

BACKGROUND OF THE INVENTION

The present disclosure relates to a pressure sensor element and a pressure sensor and, more particularly, to a pressure sensor element and a pressure sensor that detect a pressure using deformation of a diaphragm.

A pressure sensor having strain resistance gauges on a thin plate diaphragm is used in pressure measurement. As illustrated in FIGS. 7 and 8, a pressure sensor element 100 of this type includes a thin plate diaphragm 110, a holding member 120 that holds the diaphragm 110, and strain resistance gauges 130a, 130b, 130c, and 130d formed on a first surface 110a of the diaphragm 110. It should be noted here that FIG. 8 illustrates a cross section of the pressure sensor element 100 in FIG. 7 taken along line C-C.

Of these members, the holding member 120 has an annular end surface 120a facing the first surface 110a of the diaphragm 110 and holds the diaphragm 110 with this end surface 120a joined to the circumferential edge portion of the first surface 110a of the diaphragm 110.

In addition, the strain resistance gauges 130a, 130b, 130c, and 130d formed on the first surface 110a of the diaphragm 110 are elements that change in resistance values according to the strain or stress that is generated on the first surface 110a when the diaphragm 110 is deformed.

In this example, a pressure guide member 150 having a pressure guiding hole 150a is provided to guide, to the second surface 110b of the diaphragm 110, a fluid whose pressure is to be measured.

In the pressure sensor element 100 described above, when the diaphragm 110 is deformed by receiving a pressure from the fluid guided to the second surface 110b of the diaphragm 110, the resistance values of the strain resistance gauges 130a, 130b, 130c, and 130d change according to the deformation of the diaphragm 110. The changes in the resistance values are converted into a voltage signal by a bridge circuit or the like, and then the pressure can be calculated by an arithmetic circuit (for example, patent literature 1 and patent literature 2).

CITATION LIST

Patent Literature

[PTL 1] JP-A-2005-69736
[PTL 2] JP-A-2020-16559

BRIEF SUMMARY OF THE INVENTION

By the way, in the pressure sensor element of this type, the effective diameter of the diaphragm 110 deformed by receiving a pressure, that is, the region that can be displaced in a direction orthogonal to the diaphragm 110 by receiving a pressure, is defined by the joint between the diaphragm 110 and the holding member 120, and the peak of the stress appears near the inside of the inner circumference 120b (often referred to below as the "joint edge") of the end surface 120a of the holding member 120 in plan view when a pressure is applied to the diaphragm 110.

However, the positions of the strain resistance gauges within the displaceable region of the diaphragm 110 may be displaced due to the alignment error generated when the end surface 120a of the holding member 120 is joined to the first surface 110a of the diaphragm 110. When the positions of the strain resistance gauges 130a, 130b, 130c, and 130d with respect to the displaceable region of the diaphragm 110 are displaced, desired pressure sensitivity may not be obtained or the measurement results may be unstable. Accordingly, although the alignment accuracy needs to be increased to improve the yield of the pressure sensor element, there is a limit to the rise in the alignment accuracy.

Accordingly, an object of the present disclosure is to provide a pressure sensor element and a pressure sensor that have stable pressure sensitivity without the need for improving the accuracy of alignment between the diaphragm and the holding member in the pressure sensor element and the pressure sensor obtained by joining the diaphragm to the holding member.

To achieve the object described above, a pressure sensor element according to the present disclosure includes a thin plate diaphragm (11), a holding member (12) that has an annular end surface (12a) facing a first surface (11a) of the diaphragm and holds the diaphragm with the end surface joined to a circumferential edge portion of the first surface of the diaphragm, and strain resistance gauges (13a, 13b, 13c, and 13d) that are provided on the first surface of the diaphragm and change in resistance values according to deformation of the diaphragm, in which the holding member (12) has recesses (14a, 14b, 14c, and 14d) that are formed on the end surface and cut out parts of the inner circumference of the end surface, and the strain resistance gauges (13a, 13b, 13c, and 13d) are disposed near regions corresponding to the recesses (14a, 14b, 14c, and 14d) on the first surface (11a) of the diaphragm (11).

In the pressure sensor element according to an embodiment of the present disclosure, at least parts of the strain resistance gauges (13a, 13b, 13c, and 13d) may be formed in regions surrounded by the inner circumference of the end surface of the holding member as seen in a direction orthogonal to the diaphragm on the first surface (11a) of the diaphragm (11).

In the pressure sensor element described above, the strain resistance gauges (13a, 13b, 13c, and 13d) may be formed across the region surrounded by the inner circumference of the end surface (12a) of the holding member (12) and regions corresponding to the recesses (14a, 14b, 14c, and 14d) as seen in the direction orthogonal to the diaphragm on the first surface (11a) of the diaphragm.

In addition, in the pressure sensor element described above, the inner circumference of the end surface (12a) may be of a circular, elliptical, or polygonal shape in plan view.

In addition, in the pressure sensor element described above, the strain resistance gauges (13a, 13b, 13c, and 13d) may be piezoresistive elements.

In addition, the pressure sensor element described above may further include at least four strain resistance gauges (13a, 13b, 13c, and 13d), the strain resistance gauge being one of the at least four strain resistance gauges, in which the holding member may have at least four recesses (14a, 14b, 14c, and 14d) formed on the end surface (12a), the recess being one of the at least four recesses, and the at least four strain resistance gauges may be disposed near regions corresponding to the at least four recesses, respectively, on the first surface of the diaphragm.

In addition, in the pressure sensor element described above, the at least four strain resistance gauges (13a, 13b, 13c, and 13d) may form a bridge circuit.

The pressure sensor according to the present disclosure includes the pressure sensor element (1) described above and an arithmetic circuit (2) that calculates a pressure applied to the diaphragm based on a change in resistance values of the strain resistance gauges.

An object of the present disclosure is to provide the pressure sensor element and the pressure sensor that have stable pressure sensitivity without the need for improving the accuracy of alignment between the diaphragm and the holding member by providing the recesses on the end surface of the holding member to be joined to the diaphragm.

DETAILED DESCRIPTION OF THE INVENTION

The inventor has identified that, in a pressure sensor element that detects a pressure using deformation of a diaphragm, the stress generated on the surface of the diaphragm when a pressure is applied to the diaphragm has a steep peak inside the joint edge with respect to the holding member, and that the stress is substantially zero in the joint region (just outside the joint edge) with respect to the holding member. That is, the sensitivity efficiency of the pressure sensor element is the best if the strain resistance gauge can be disposed near the joint edge at which the stress peak occurs. However, since the stress peak is steep, the sensitivity drops extremely when the positions at which the strain resistance gauges are disposed deviate from the position at which the stress peak occurs, thereby affecting the yield. In contrast, it is possible to prevent the sensitivity from extremely dropping due to positional deviation by disposing the strain resistance gauges inside the joint edge, but the stress peak cannot be detected efficiently and the sensitivity considerably drops, thereby affecting the yield.

That is, to efficiently detect the stress generated on the diaphragm surface when a pressure is applied, the strain resistance gauges need to be disposed as close to the joint edge with respect to the holding member of the diaphragm as possible. However, if the strain resistance gauge partly enters the joint region due to the deviation between the diaphragm and holding member at the time of joining, the sensitivity is significantly reduced. Accordingly, to improve the yield, the accuracy of joint between the diaphragm and the holding member needs to be raised or the sensitivity needs to be compromised by disposing the strain resistance gauges inside the joint edge of the diaphragm. As described above, it is difficult to improve both yield and the sensitivity, which are conflicting issues.

Accordingly, focusing on the positional relationship between the joint region of the diaphragm with respect to the holding member and the strain resistance gauges, the inventor has found the idea of expanding the "portion in which a stress at a certain level or more occurs" that is generated at the joint edge of the diaphragm with respect to the holding member to the positions at which the strain resistance gauges are provided by providing recesses on the end surface of the holding member to be joined to the diaphragm and setting the local areas around the strain resistance gauges to be non-joint portions that are not joined to the holding member to suppress reduction in sensitivity due to the deviation of joint between the diaphragm and the holding member as much as possible without the need for improving the joint accuracy.

An embodiment of the present disclosure will be described with reference to the drawings.

[Overview of the Pressure Sensor Element]

Figure 1:
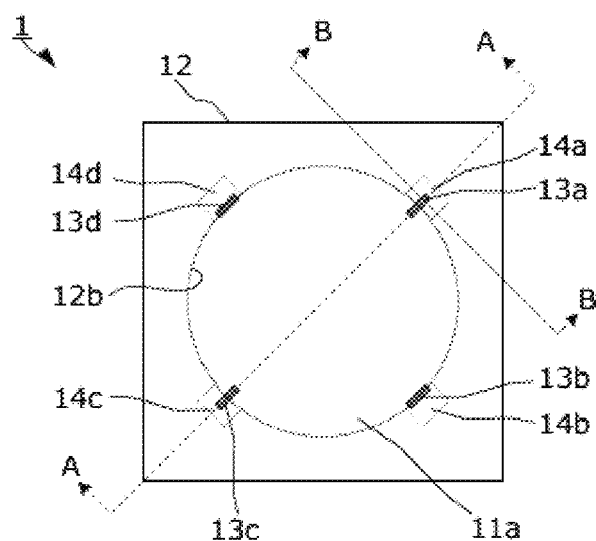
FIG. 1 is a plan view illustrating one structure example of a pressure sensor element according to an embodiment of the present disclosure.
Figure 2:
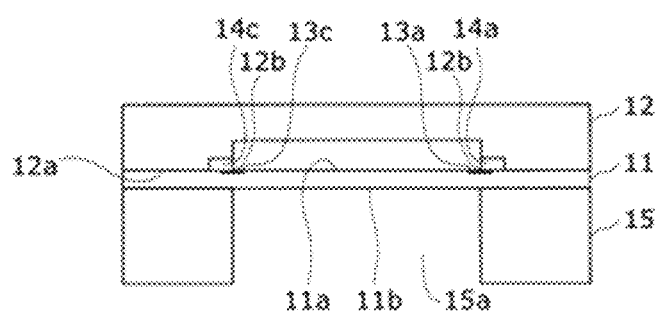
FIG. 2A is a sectional view illustrating the pressure sensor element according to the embodiment taken along line A-A in FIG. 1.
FIG. 2B is a sectional view illustrating the pressure sensor element according to the embodiment taken along line B-B in FIG. 1.
Figure 2:
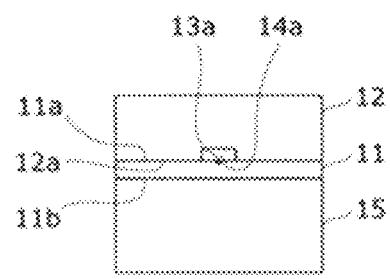

As illustrated in FIGS. 1, 2A, and 2B, a pressure sensor element 1 according to the embodiment of the present disclosure includes a thin plate diaphragm 11, a holding member 12 that holds this diaphragm, and four strain resistance gauges 13a, 13b, 13c, and 13d provided on a first surface 11a of the diaphragm 11.

Here, the holding member 12 has an annular end surface 12a facing the first surface 11a of the diaphragm 11 and holds the diaphragm 11 with this end surface 12a joined to the circumferential edge portion of the first surface 11a of the diaphragm 11. In addition, recesses 14a, 14b, 14c, and 14d are formed on the end surface 12a of the holding member 12 to be joined to the diaphragm 11 so as to cut out parts of an inner circumference 12b of the end surface 12a. The recesses described above may be referred to as "escape grooves".

The strain resistance gauges 13a, 13b, 13c, and 13d are disposed near the regions on the first surface 11a of the diaphragm 11 that correspond to the escape grooves (recesses) 14a, 14b, 14c, and 14d, respectively. Here, the width and length of the escape grooves 14a, 14b, 14c, and 14d are desirably equal to or larger than the joint accuracy (for example, 10 μm or more), but the width and length are desirably as small as possible because the stress to be generated on the diaphragm 11 is dispersed if they are too large.

In addition, a cylindrical pressure guide member 15 having a pressure guiding hole 15a is provided on the side of the diaphragm 11 opposite to the holding member 12.

[Diaphragm and Holding Member]

In the embodiment, the holding member 12 is formed so that the inner circumference 12b of the end surface 12a is substantially circular as seen in the direction orthogonal to the diaphragm 11. Accordingly, by joining the diaphragm 11 and the holding member 12 to each other with the first surface 11a of the diaphragm 11 facing the end surface 12a of the holding member 12, the diaphragm 11 includes the region of the end surface 12a surrounded by the inner circumference (joint edge) 12b and the other region.

Of these regions, the region of the diaphragm 11 surrounded by the inner circumference (joint edge) 12b of the end surface 12a of the holding member 12 in plan view is displaceable when the diaphragm 11 receives a pressure. The region of the diaphragm 11 surrounded by the inner circumference (joint edge) 12b of the end surface 12a of the holding member 12 may be referred to below as the "effective region". As described above, when a pressure is applied to the diaphragm 11, the largest stress is generated in the vicinity of the inner circumference (joint edge) 12b of the end surface 12a of the holding member 12 in plan view within the effective region.

In addition, since the escape grooves (recesses) 14a, 14b, 14c, and 14d are formed on the end surface 12a of the holding member 12, when the diaphragm 11 and the holding member 12 are joined to each other with the first surface 11a of the diaphragm 11 facing the end surface 12a of the holding member 12, the region of the diaphragm 11 other than the effective region includes the region (may be referred to below as the "joint region") joined to the holding member 12, and the regions (may be referred to below as the "non-joint region"), corresponding to the escape grooves (recesses) 14a, 14b, 14c, and 14d formed on the holding member 12, that are not joined to the holding member 12.

Of these regions, no stress is generated in the joint region of the diaphragm 11 when a pressure is applied to the diaphragm 11, but a slight stress is generated in the non-joint region.

[Pressure Guide Member]

The pressure guide member 15 provided on the second surface 11b of the diaphragm 11 is a member that guides a fluid whose pressure is to be measured to the second surface 11b of the diaphragm 11, but the pressure guide member 15 is not necessarily required. When the pressure guide member 15 is provided, the shape and the size of the pressure guiding hole 15a are desirably equal to or larger than the effective region of the diaphragm 11 as seen in the direction orthogonal to the diaphragm 11 so as not to affect the deformation of the diaphragm 11 having received a pressure.

[Materials of Individual Members and the Joining Method Between Individual Members]

Here, the diaphragm 11 and the holding member 12 may be made of silicon. In this case, these members are joined to each other by surface-activated room-temperature bonding.

The diaphragm 11 and the holding member 12 are made of silicon in the embodiment, but, in the present disclosure, the materials of these members are not limited to silicon, and the diaphragm 11 and the holding member 12 may be made of a metal material such as, for example, stainless steel or titanium, glass, or the like.

In addition, the diaphragm 11 and the holding member 12 may be made of the same material, or may be made of different materials. However, when the diaphragm 11 and the holding member 12 are made of different materials, these materials desirably have similar thermal expansion coefficients. For example, when the diaphragm 11 is made of silicon, the holding member 12 may be made of borosilicate glass (PYREX®).

When the diaphragm 11 and the holding member 12 are made of a material other than silicon, for example, a metal material such as stainless steel, these members can be joined to each other by diffusion joint that uses diffusion of atoms caused between the joint surfaces by performing surface treatment of the first surface 11a of the diaphragm 11 and the end surface 12a of the holding member 12 in a vacuum, bringing these members into close contact with each other, and pressurizing these members while causing as little plastic deformation as possible at a temperature equal to or less than the melting point of the material. As a method for joining the diaphragm 11 and the holding member 12 to each other, another method that uses an adhesive, a laser, soldering, or brazing may be selected as appropriate according to the material.

It should be noted here that, when the pressure guide member 15 is provided, the pressure guide member 15 can be joined to the diaphragm 11 by the same method as for the holding member 12. Furthermore, when the diaphragm 11 and the pressure guide member 15 are made of silicon, these members may be integrally formed by, for example, an etching process.

[Strain Resistance Gauge]

The strain resistance gauges 13a, 13b, 13c, and 13d are formed on the first surface 11a of the diaphragm 11. The strain resistance gauges 13a, 13b, 13c, and 13d are piezoresistive elements formed by diffusion or ion implantation on the first surface 11a of the diaphragm 11 made of silicon. The piezoresistive element is an element that utilizes piezoresistive effects that change the resistivity according to the stress, and the resistance value thereof changes according to the stress applied to the element. When the diaphragm 11 is made of a material other than silicon, metal thin film strain resistance gauges may be formed on the surface of the diaphragm 11 by a film formation technique such as vapor deposition or sputtering, or commercially available strain gauges may be attached with an adhesive.

Figure 3:
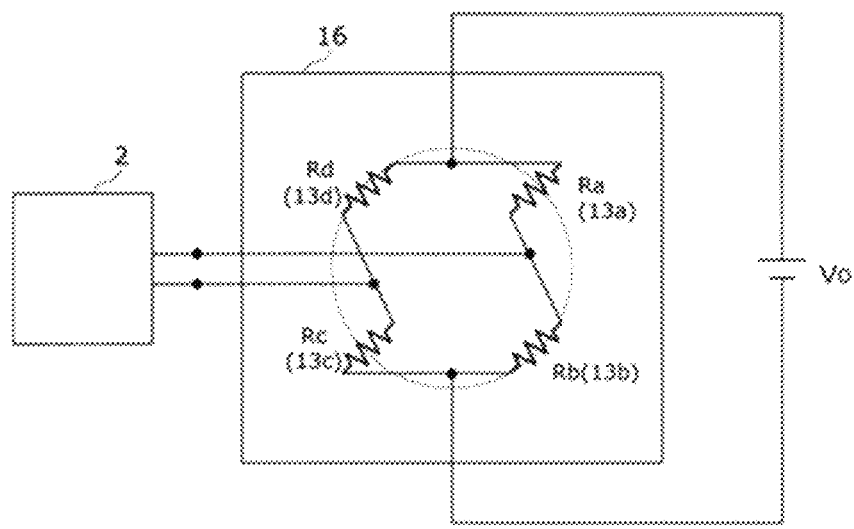
FIG. 3 is an explanatory view illustrating the circuit structure of a pressure sensor according to the embodiment.

The four strain resistance gauges 13a, 13b, 13c, and 13d are electrically connected to each other by wirings (not illustrated) formed on the diaphragm 11 and constitute a bridge circuit 16 as illustrated in FIG. 3. Accordingly, the pressure sensor can be configured by further providing an arithmetic circuit 2 that calculates the pressure applied to the diaphragm 11 based on the output voltage of the bridge circuit 16 that reflects the changes in the resistance values of the four strain resistance gauges 13a, 13b, 13c, and 13d. The arithmetic circuit 2 as described above can include, for example, an A/D converter and a processor.

In the embodiment, as illustrated in FIG. 1, of the four strain resistance gauges 13a, 13b, 13c, and 13d, the two strain resistance gauges 13a and 13c that are disposed in positions facing each other across the center of the diaphragm 11 are formed along the direction intersecting the inner circumference of the end surface 12a of the holding member 12 as seen in the direction orthogonal to the diaphragm 11, and the other strain resistance gauges 13b and 13d are formed along the inner circumference of the end surface 12a of the holding member 12.

In addition, the strain resistance gauges 13a, 13b, 13c, and 13d are desirably disposed near the boundary with the joint region in which the largest stress is generated when the pressure is applied to the diaphragm 11 within the effective region, that is, near the inner circumference (joint edge) 12b of the end surface 12a of the holding member 12 in plan view. Since the escape grooves (recesses) 14a, 14b, 14c, and 14d are formed on the end surface 12a of the holding member 12, a non-joint region continuous with the effective region is formed near the strain resistance gauges 13a, 13b, 13c, and 13d, whereby the region in which a stress at a certain level or more is generated can be expanded in the regions in which the strain resistance gauges 13a, 13b, 13c, and 13d are formed. This suppresses reduction in the pressure sensitivity due to misalignment when the diaphragm 11 and the holding member 12 are joined to each other, thereby achieving a pressure sensor with stable pressure sensitivity without the need for improving the accuracy of alignment when the diaphragm 11 and the holding member 12 are joined to each other.

[Simulation]

Next, the results of computer simulation concerning the stress distribution generated on the diaphragm 11 of the pressure sensor element according to the embodiment will be described with reference to FIGS. 4 to 6.

Figure 4:
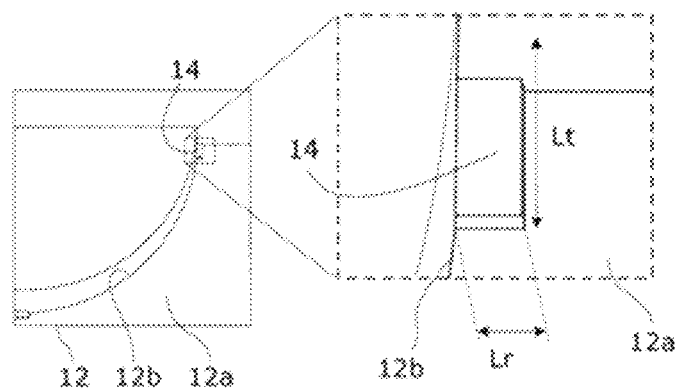
FIG. 4 is an explanatory view illustrating a model of the pressure sensor element used in a simulation concerning a stress distribution generated on a diaphragm.
Figure 5:
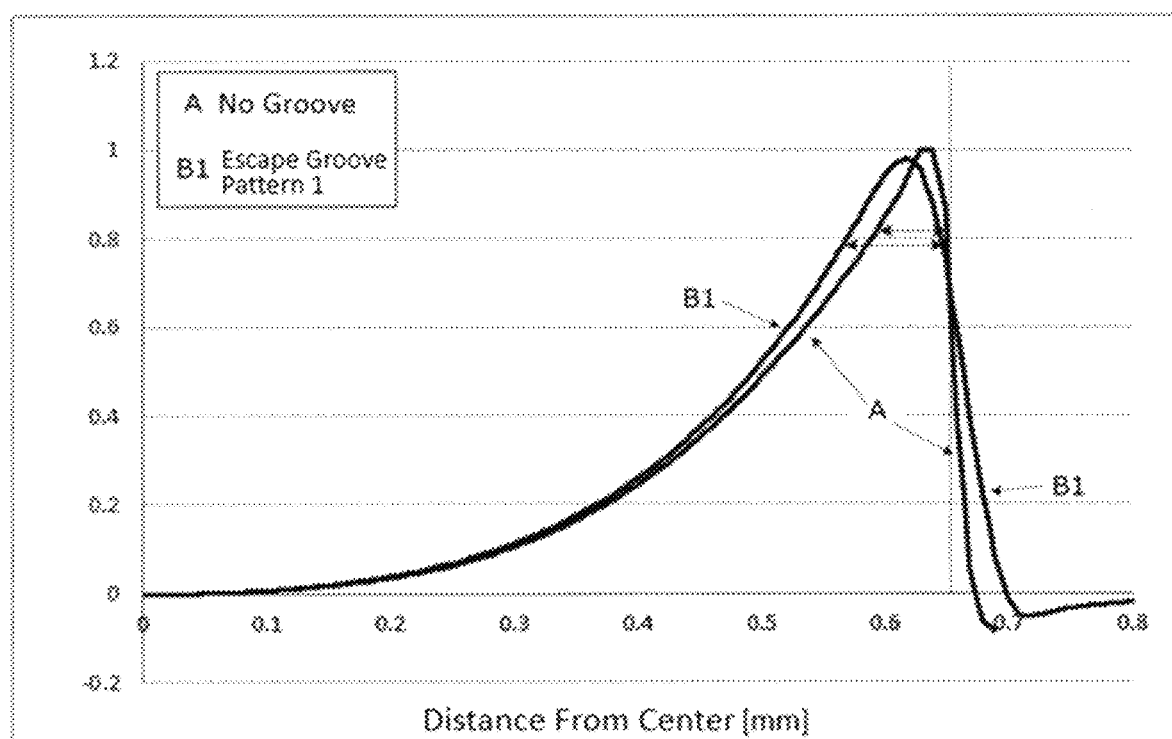
FIG. 5 is a diagram illustrating the result of a first simulation of the stress distribution generated on the diaphragm.

FIG. 4 is a diagram illustrating a model of the pressure sensor element 1 used in the simulation, especially the structure of the escape grooves (recesses) 14. It should be noted here that, in the simulation, the diaphragm 11 is a thin plate, made of silicon, that has a thickness of and the region inside the inner circumference 12b of the end surface 12a of the holding member 12 (that is, the effective region of the diaphragm 11) is a circle that has a radius of approximately 0.65 mm. In addition, as illustrated in FIG. 4, the escape grooves (recesses) 14 formed on the end surface 12a of the holding member 12 are formed in rectangular strips in plan view.

In the simulation, the following two patterns of the escape grooves were analyzed by the finite element method that uses, as parameters, the radial length Lr and the tangential length Lt of the effective region of the escape grooves (recesses) 14 formed on the end surface 12a of the holding member 12.

Escape groove pattern <1>: Lr 0.02 mm, Lt 0.1 mm
Escape groove pattern <2>: Lr 0.04 mm, Lt 0.2 mm FIG. 5 illustrates the results of simulation of the stress distribution (B1) in the radial direction from the center of the diaphragm 11 when the escape grooves 14 of the escape groove pattern <1> were formed together with the stress distribution (A) when the escape grooves 14 were not provided. It should be noted here that the vertical axes in FIGS. 5 and 6 represent the values normalized by assuming the peak of the stress distribution to be 1 when the escape grooves 14 were not provided. In the escape groove pattern <1>, the peak value of the stress generated on the diaphragm 11 remains largely unchanged at approximately 1.0. When the escape grooves 14 were provided, due to the presence of the non-joint region, the position of the peak of the stress is slightly shifted toward the center of the diaphragm 11 as compared with the case in which the escape grooves 14 were not provided, and the stress gently reduces from the peak toward the joint region. As a result, it can be seen that the range in which a stress at a certain level or more was generated was expanded when the escape grooves 14 were provided and the range in which a stress of 0.8 or more was generated was expanded by approximately 25% as illustrated by, for example, the dotted arrows.

Figure 6:
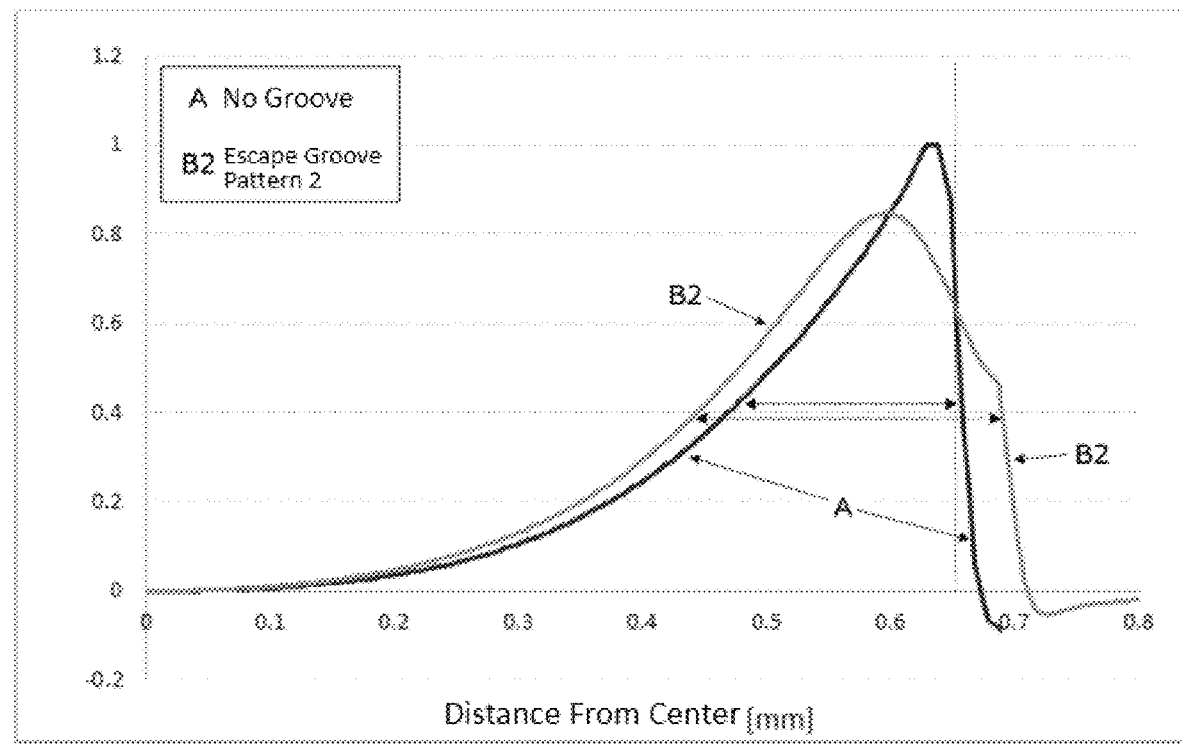
FIG. 6 is a diagram illustrating the result of a second simulation of the stress distribution generated on the diaphragm.
Figure 7:
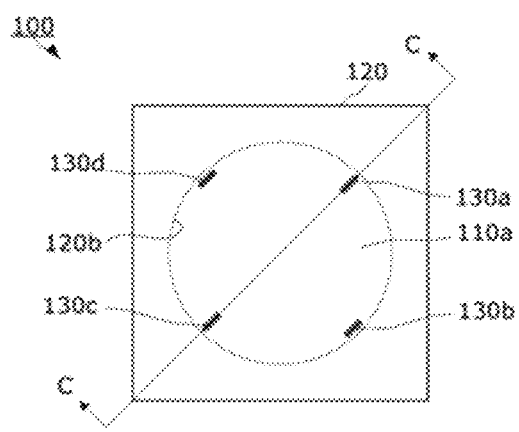
FIG. 7 is a plan view illustrating one structure example of a conventional pressure sensor element.
Figure 8:
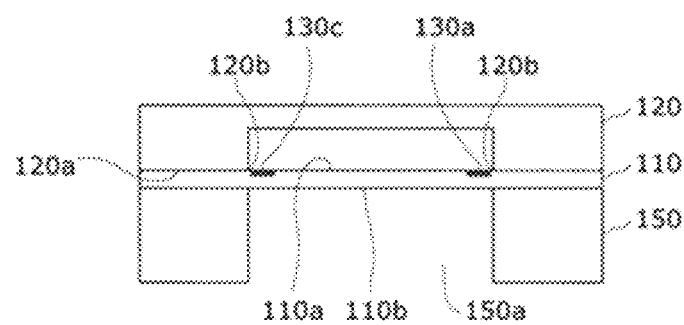
FIG. 8 is a sectional view illustrating one structure example of the conventional pressure sensor element.

In contrast, FIG. 6 illustrates the results of simulation of the stress distribution (B2) in the radial direction from the center of the diaphragm 11 when the escape grooves 14 of the above escape groove pattern <2> were formed together with the stress distribution (A) when the escape grooves 14 were not provided. In this escape groove pattern <2>, both the radial length Lr and the tangential length Lt are larger than in the escape groove pattern <1> described above. In the case of the escape groove pattern <2>, it can be seen that the peak value of the stress generated on the diaphragm 11 was approximately 15% smaller than in the case in which the escape grooves were not formed, but the range in which a stress at a certain level or more was generated was further expanded. For example, as illustrated by the dotted arrows, the range in which a stress of 0.4 or more was generated was expanded by approximately 30%.

By providing the escape grooves (recesses) 14 on the end surface 12a of the holding member 12 to be joined to the diaphragm 11 and setting the local regions around the strain resistance gauges to be non-joint regions that are not joined to the holding member as described above, the region on the diaphragm 11 in which a stress at a certain level or more is generated inside the joint edge with respect to the holding member 12 can be expanded, thereby suppressing reduction in sensitivity due to the misalignment of joint between the diaphragm 11 and the holding member 12 without the need for increasing the accuracy of joint between the diaphragm and the holding member.

[Extension of the Embodiment]

The four strain resistance gauges 13a, 13b, 13c, and 13d constitute the bridge circuit 16 in the embodiment described above, but the number of the strain resistance gauges is arbitrary and may be one or the bridge circuit is not necessarily required.

In addition, in the embodiment described above, the strain resistance gauges 13a, 13b, 13c, and 13d are formed across the region (effective region) of the first surface 11a of the diaphragm 11 surrounded by the inner circumference (joint edge) 12b of the end surface 12a of the holding member 12 and the regions (non-joint regions) corresponding to the escape grooves (recesses) 14a, 14b, 14c, and 14d formed on the end surface 12a of the holding member 12, as illustrated in FIG. 1. By disposing the strain resistance gauges 13a, 13b, 13c, and 13d as described above, it is expected that the changes in the resistance values due to the largest stress can be obtained when a pressure is applied to the diaphragm 11. However, in the present disclosure, it is sufficient that the strain resistance gauges are disposed at positions in the effective region at which the largest stress is generated when a pressure is applied to the diaphragm 11, and disposition of the strain resistance gauges across the effective region and the non-joint regions of the diaphragm 11 is only one example of disposition of the strain resistance gauges.

In addition, the inner circumference (joint edge) 12b of the end surface 12a of the holding member 12 has a substantially circular shape in plan view in the embodiment described above, but the shape formed by the inner circumference (joint edge) of the end surface 12a is not limited to a circular shape and may be any shape other than a circular shape, such as, for example, an elliptical shape or a polygonal shape.

In addition, the escape grooves (recesses) formed on the end surface 12a of the holding member 12 are formed in a rectangular strip shape in plan view in the embodiment described above, but the shape in plan view may be any shape other than a rectangular strip shape, such as, for example, a partially-chipped circular shape, an elliptical shape, a fan shape (partial circle), a trapezoidal shape, or a polygonal shape as long as parts of the inner circumference 12b of the end surface 12a are cut out.

Embodiments of the present disclosure have been described above, but the embodiments are merely examples of the present disclosure and may be modified variously without departing from the spirit of the present disclosure.

The present disclosure can be used in the field of pressure measurement.

DESCRIPTION OF REFERENCE NUMERALS AND SIGNS

1: pressure sensor element, 11: diaphragm, 12: holding member, 12a: end surface, 12b: inner circumference (joint edge), 13a, 13b, 13c, 13d: strain resistance gauge, 14, 14a, 14b, 14c, 14d: escape groove (recess), 16: bridge circuit, 2: arithmetic circuit

The invention claimed is:

1. A pressure sensor element comprising:
a thin plate diaphragm;
a holding member that has an annular end surface facing a first surface of the diaphragm and holds the diaphragm with the end surface joined to a circumferential edge portion of the first surface of the diaphragm; and
a strain resistance gauge that is provided on the first surface of the diaphragm and changes in a resistance value according to deformation of the diaphragm;
wherein
the holding member has a recess that is formed on the end surface and cuts out a part of an inner circumference of the end surface, and
the strain resistance gauge is disposed near a region corresponding to the recess on the first surface of the diaphragm.

2. The pressure sensor element according to claim 1, wherein at least a part of the strain resistance gauge is formed in a region surrounded by the inner circumference of the end surface of the holding member as seen in a direction orthogonal to the diaphragm on the first surface of the diaphragm.

3. The pressure sensor element according to claim 2, wherein the inner circumference of the end surface is of a circular, elliptical, or polygonal shape in plan view.

4. The pressure sensor element according to claim 2, wherein the strain resistance gauge is a piezoresistive element.

5. The pressure sensor element according to claim 1, wherein the strain resistance gauge is formed across a region surrounded by the inner circumference of the end surface of the holding member and the region corresponding to the recess as seen in a direction orthogonal to the diaphragm on the first surface of the diaphragm.

6. The pressure sensor element according to claim 5, wherein the inner circumference of the end surface is of a circular, elliptical, or polygonal shape in plan view.

7. The pressure sensor element according to claim 5, wherein the strain resistance gauge is a piezoresistive element.

8. The pressure sensor element according to claim 1, wherein the inner circumference of the end surface is of a circular, elliptical, or polygonal shape in plan view.

9. The pressure sensor element according to claim 1, wherein the strain resistance gauge is a piezoresistive element.

10. A pressure sensor element comprising:
a thin plate diaphragm;
a holding member that has an annular end surface facing a first surface of the diaphragm and holds the diaphragm with the end surface joined to a circumferential edge portion of the first surface of the diaphragm; and
at least four strain resistance gauges that are provided on the first surface of the diaphragm and change in resistance values according to deformation of the diaphragm;
wherein
the holding member has at least four recesses that are formed on the end surface and cut out parts of an inner circumference of the end surface, and
each of the at least four strain resistance gauges is independently disposed near one of regions corresponding to the at least four recesses on the first surface of the diaphragm.

11. The pressure sensor element according to claim 10, wherein the at least four strain resistance gauges form a bridge circuit.

12. The pressure sensor element according to claim 11, wherein at least a part of each of the at least four strain resistance gauges is formed in a region surrounded by the inner circumference of the end surface of the holding member as seen in a direction orthogonal to the diaphragm on the first surface of the diaphragm.

13. The pressure sensor element according to claim 11, wherein each of the at least four strain resistance gauges is formed across a region surrounded by the inner circumference of the end surface of the holding member and one of the regions corresponding to the at least four recesses as seen in a direction orthogonal to the diaphragm on the first surface of the diaphragm.

14. The pressure sensor element according to claim 11, wherein the at least four strain resistance gauges are piezoresistive elements.

15. A pressure sensor comprising:
the pressure sensor element according to claim 11; and
an arithmetic circuit that calculates a pressure applied to the diaphragm based on changes in the resistance values of the at least four strain resistance gauges.

16. The pressure sensor according to claim 15, wherein at least a part of each of the at least four strain resistance gauges is formed in a region surrounded by the inner circumference of the end surface of the holding member as seen in a direction orthogonal to the diaphragm on the first surface of the diaphragm.

17. The pressure sensor according to claim 15, wherein each of the at least four strain resistance gauges is formed across a region surrounded by the inner circumference of the end surface of the holding member and one of the regions corresponding to the at least four recesses as seen in a direction orthogonal to the diaphragm on the first surface of the diaphragm.

18. The pressure sensor element according to claim 10, wherein at least a part of each of the at least four strain resistance gauges is formed in a region surrounded by the inner circumference of the end surface of the holding member as seen in a direction orthogonal to the diaphragm on the first surface of the diaphragm.

19. The pressure sensor element according to claim 10, wherein each of the at least four strain resistance gauges is formed across a region surrounded by the inner circumference of the end surface of the holding member and one of the regions corresponding to the at least four recesses as seen in a direction orthogonal to the diaphragm on the first surface of the diaphragm.

20. The pressure sensor element according to claim 10, wherein the at least four strain resistance gauges are piezoresistive elements.

* * * * *